Sept. 1, 1936.  M. H. GREENE  2,052,822
RELEASING DEVICE FOR REFRIGERATOR ICE TRAYS
Filed March 25, 1935
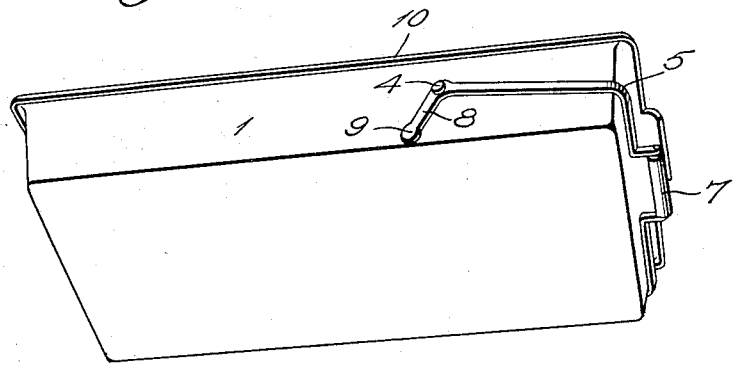
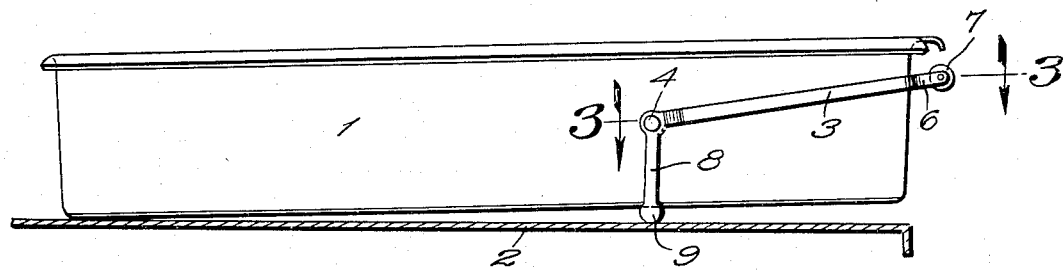
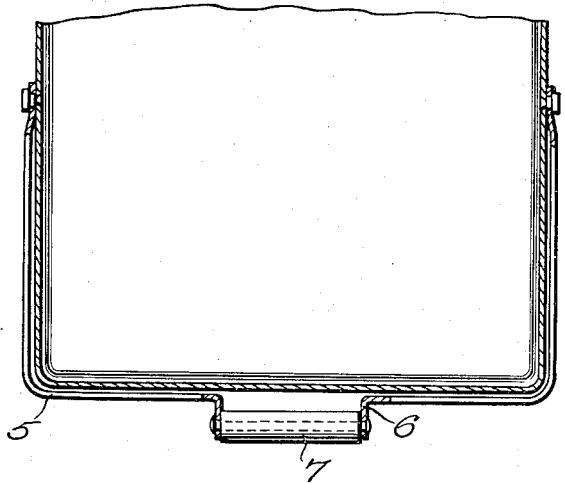
Max H. Greene
INVENTOR
BY Victor J. Evans & Co.
ATTORNEY
WITNESS Patented Sept. 1, 1936

2,052,822

UNITED STATES PATENT OFFICE 2,052,822

RELEASING DEVICE FOR REFRIGERATOR ICE TRAYS

Max Hoffman Greene, Chattanooga, Tenn., assignor of one-half to John T. Clark, New York, N. Y.

Application March 25, 1935, Serial No. 12,978

1 Claim. (Cl. 62—108.5)

This invention relates to releasing devices for ice trays of mechanical refrigerators, and has for the primary object the provision of a device which may be readily adapted to a tray and provides thereto a convenient and economical medium whereby the tray may be easily released from its support when frozen thereto and further provides a handle to the tray so that the latter may be easily withdrawn from the freezing unit of the refrigerator.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a perspective view illustrating an ice tray equipped with a releasing device constructed in accordance with my invention.

Figure 2 is a side elevation, partly in section, showing the tray released from its support by said releasing device.

Figure 3 is a sectional view taken on the line 3—3 of Figure 2.

Referring in detail to the drawing, the numeral 1 indicates a tray employed in refrigerators or the freezing unit of said refrigerators for the purpose of containing water to be frozen into ice. The tray frequently becomes frozen to the support 2 of a freezing unit, rendering it difficult to remove the tray from the freezing unit when desired. Arms 3 are pivoted to opposite sides of the tray, as shown at 4, and are bent to extend about one end of the tray, as shown at 5, and the free ends of said arms are offset, as shown at 6, and have connected thereto a handle 7. Extensions 8 are formed on the pivoted ends of the arms 3 and are arranged approximately at right angles to the latter and have their free ends slightly enlarged, as shown at 9, to form the extensions into cams. The handle when in its lowermost position with respect to the end of the tray positions the cams above the bottom wall of the tray so that said bottom wall may rest evenly upon the support 2. An elevation of the handle 7 will bring about engagement of the extensions with the support elevating the tray from the support, as shown in Figure 2. Should the tray be frozen to the support, the elevation of the tray by the extensions will free the tray from the support and permit the removal of the tray easily from the support or freezing unit of the refrigerator.

It is preferable that the tray be provided with marginal flanges 10 which overhang the arms 3, extensions 8, and pivots 4 to prevent water from coming in contact with these parts should the water be spilled by the tipping of the tray during the insertion of the latter into the freezing unit. By keeping the arms and extensions and pivots 4 free of water the attachment of the tray will then be left in a free state so that it can be readily moved relative to the tray when desiring to free the latter from a frozen position on the support.

Having described the invention, I claim:

In combination with an ice tray of a refrigerator, cam elements having certain ends thereof pivoted to opposite sides of the tray and movable to extend the other ends thereof either above or below the bottom wall of the tray, arms integral with the pivoted ends of the cam elements and bent to extend about one end of the tray, and a handle connecting said arms whereby a pivotal movement may be imparted to the cam elements to engage the latter with a support of the tray for breaking the tray loose from the support when frozen thereto.

MAX HOFFMAN GREENE.